US008425365B2

(12) United States Patent
Wittkopp et al.

(10) Patent No.: US 8,425,365 B2
(45) Date of Patent: *Apr. 23, 2013

(54) PLANETARY LAYSHAFT TRANSMISSION

(75) Inventors: Scott H. Wittkopp, Ypsilanti, MI (US);
Andrew W. Phillips, Rochester, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/976,436

(22) Filed: Dec. 22, 2010

(65) Prior Publication Data

US 2012/0165154 A1  Jun. 28, 2012

(51) Int. Cl.
*F16H 3/44* (2006.01)

(52) U.S. Cl.
USPC .......................................................... 475/269

(58) Field of Classification Search .................. None
See application file for complete search history.

(56) References Cited

U.S. PATENT DOCUMENTS

| | | | | |
|---|---|---|---|---|
| 6,045,477 | A * | 4/2000 | Schmidt ........................ | 475/207 |
| 7,384,361 | B2 * | 6/2008 | Tabata et al. .................. | 475/215 |
| 2012/0100952 | A1 * | 4/2012 | Wittkopp et al. ............. | 475/219 |

* cited by examiner

*Primary Examiner* — Dirk Wright

(57) ABSTRACT

A transmission is provided having an input member, an output member, at least one planetary gear set, a plurality of transfer gears connected by a layshaft, a plurality of coupling members and a plurality of torque transmitting devices. Each of the planetary gear sets includes first, second and third members. The torque transmitting devices include clutches and brakes.

19 Claims, 4 Drawing Sheets

| GEAR STATE | GEAR RATIO | RATIO STEP | TORQUE TRANSMITTING ELEMENTS | | | | | |
|---|---|---|---|---|---|---|---|---|
| | | | 36 | 34 | 32 | 30 | 28 | 26 |
| REV | -3.000 | | X | | X | | | |
| N | | -0.74 | | | O | | | |
| 1st | 4.077 | | | X | X | | | |
| 2nd | 2.555 | 1.60 | X | | | | X | |
| 3rd | 1.769 | 1.44 | X | | | X | | |
| 4th | 1.248 | 1.42 | | | | X | X | |
| 5th | 1.000 | 1.25 | | | X | X | | |
| 6th | 0.794 | 1.26 | | | | X | | X |
| 7th | 0.690 | 1.15 | | | X | | | X |
| 8th | 0.627 | 1.10 | | | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | | |
|---|---|---|---|---|---|---|---|---|
| | | | 136 | 134 | 132 | 130 | 126 | 128 |
| REV | -3.477 | | X | | | | | X |
| N | | -0.86 | O | | | | | |
| 1st | 4.056 | | X | | | | X | |
| 2nd | 2.464 | 1.65 | | X | | | X | |
| 3rd | 1.690 | 1.46 | | | | | X | X |
| 4th | 1.389 | 1.22 | | | X | | X | |
| 5th | 1.205 | 1.15 | | | | X | X | |
| 6th | 1.000 | 1.20 | | | X | X | | |
| 7th | 0.834 | 1.20 | | | | X | | X |
| 8th | 0.673 | 1.24 | | X | | X | | |

X = ON - ENGAGED CARRYING TORQUE
O = ON - ENGAGED NOT CARRYING TORQUE

*Fig-7*

# PLANETARY LAYSHAFT TRANSMISSION

FIELD

The invention relates generally to a multiple speed transmission having a layshaft, at least one planetary gear set, and a plurality of torque transmitting devices and more particularly to a transmission having a two transfer gears, a layshaft, eight or more speeds, at least one planetary gear set and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, at least one planetary gear set, a plurality of transfer gears, a layshaft, a plurality of coupling members and a plurality of torque transmitting devices.

In one embodiment, the transmission includes an input member, an output member, first and second planetary gear sets each having first, second and third members, and first and second transfer gears each having a first member intermeshed with a second member, wherein the input member is continuously interconnected to at least one of the first and second transfer gears and the output member is continuously interconnected to at least one of the first and second planetary gear sets. A layshaft continuously interconnects the second gear of the first transfer gear with the first gear of the second transfer gear. A first interconnecting member continuously interconnects the second member of the first planetary gear set with the first member of the second planetary gear set. A second interconnecting member continuously interconnects the third member of the first planetary gear set with the second member of the second planetary gear set. Six torque transmitting mechanisms are each selectively engageable to interconnect at least one of the first, second and third members of the first and second planetary gear sets with at least one of the first and second members of the first and second transfer gears and a stationary member. The torque transmitting mechanisms are selectively engageable in combinations of at least two to establish at least eight forward speed ratios and at least one reverse speed ratio between the input member and the output member.

In another embodiment, a first of the six torque transmitting mechanisms is selectively engageable to interconnect the second member of the second transfer gear with the third member of the second planetary gear set.

In yet another embodiment, a second of the six torque transmitting mechanisms is selectively engageable to interconnect the second member of the second transfer gear with the first member of the first planetary gear set.

In yet another embodiment, a third of the six torque transmitting mechanisms is selectively engageable to interconnect the first member of the first transfer gear and the input member with the second member of the first planetary gear set and the first member of the second planetary gear set.

In yet another embodiment, a fourth of the six torque transmitting mechanisms is selectively engageable to interconnect the first member of the first transfer gear and the input member with the first member of the first planetary gear set.

In yet another embodiment, a fifth of the six torque transmitting mechanisms is selectively engageable to interconnect the third member of the second planetary gear set with the stationary member.

In yet another embodiment, a sixth of the six torque transmitting mechanisms is selectively engageable to interconnect the second member of the first planetary gear set and the first member of the second planetary gear set with the stationary member.

In yet another embodiment, the first member of the first planetary gear set and the third member of the second planetary gear set are sun gears, the second member of the first planetary gear set and the first member of the second planetary gear set are carrier members, and the third member of the first planetary gear set and the second member of the second planetary gear set are ring gears.

In yet another embodiment, the first and second planetary gear sets are combined into a planetary gear assembly wherein the second member of the second planetary gear set and the first interconnecting member are integrated into the third member of the first planetary gear set and the first member of the second planetary gear set and the second interconnecting member are integrated into the second member of the first planetary gear set.

In yet another embodiment, the first member of the first planetary gear set and the third member of the second planetary gear set are sun gears, the second member of the first planetary gear set is a carrier member, and the third member of the first planetary gear set is a ring gear.

In yet another embodiment, the input member is continuously interconnected to the first member of the first transfer gear.

In yet another embodiment, the output member is continuously interconnected to the third member of the first planetary gear set.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting the state of engagement of the various torque transmitting mechanisms in each of the available forward and reverse speeds or gear ratios of the transmission illustrated in FIGS. 5 and 6.

DETAILED DESCRIPTION

The following description is merely exemplary in nature and is not intended to limit the present disclosure, application, or uses.

At the outset, it should be appreciated that the embodiments of the eight speed automatic transmission of the present invention have an arrangement of permanent mechanical connections between the elements of planetary gear sets and transfer gears. For example, a first component or element of a first planetary gear set is permanently coupled to a first component or element of a second planetary gear set. A second component or element of the first planetary gear set is permanently coupled to a second component or element of the second planetary gear set. Finally, a first component or element of a first transfer gear is permanently coupled to a second component or element of a second transfer gear.

Figure 1:
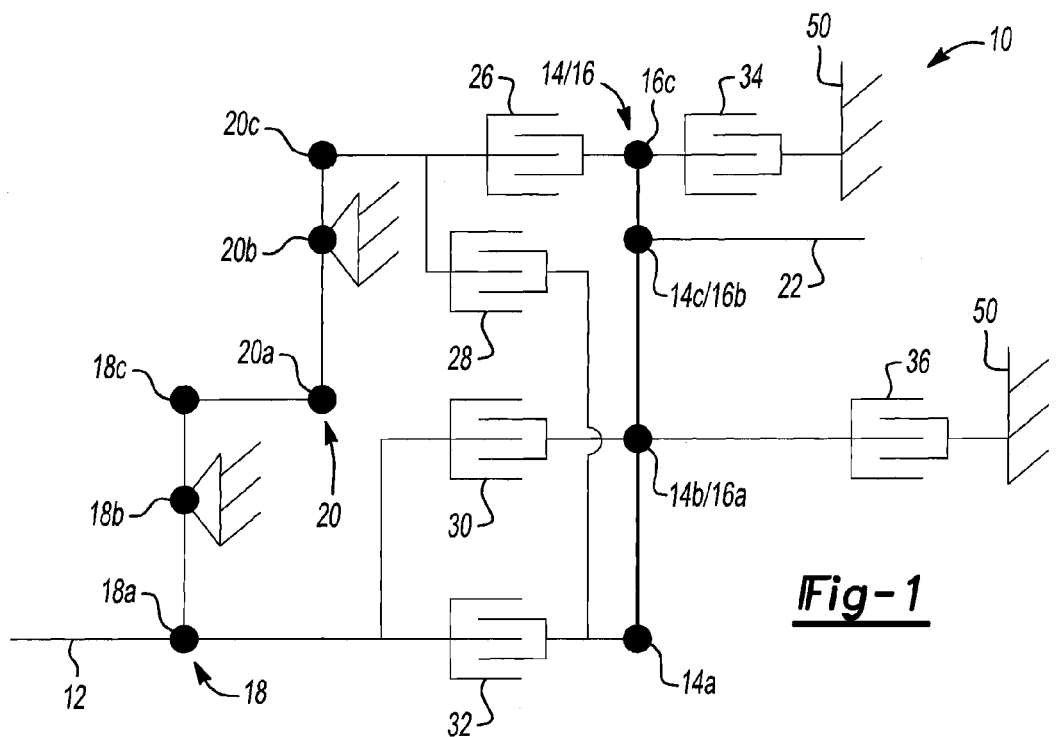
FIG. 1 is a lever diagram of an embodiment of an eight speed transmission.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a first transfer gear 18, a second transfer gear 20, and an output shaft or member 22. The first and second planetary gear sets 14 and 16 are represented by a single lever sharing common node points. The first planetary gear set has three nodes: a first node 14A, a second node 14B and a third node 14C. The second planetary gear set 16 has three nodes: a first node 16A, a second node 16B and a third node 16C. The first transfer gear includes three nodes: a first node 18A, a second node 18B and a third node 18C. The second transfer gear includes three nodes: a first node 20A, a second node 20B and a third node 20C.

The input member 12 is continuously coupled to the first node 18A of the first transfer gear 18. The output member 22 is coupled to the third node 14C of the first planetary gear set 14 and the second node 16B of the second planetary gear set 16. The third node 18C of the first transfer gear 18 is coupled to the first node 20A of the second transfer gear 20. The second nodes 18B and 20B of the first and second transfer gears 18 and 20 are fictional points used to represent the lever proportions and therefore the number of gear teeth between the first and third nodes 18A and 18C of the first transfer gear 18 and the first and third nodes 20A and 20C of the second transfer gear 20, respectively.

A first clutch 26 selectively connects the third node 20C of the second transfer gear 20 with the third node 16C of the second planetary gear set 16. A second clutch 28 selectively connects the third node 20C of the second transfer gear 20 with the first node 14A of the first planetary gear set 14. A third clutch 30 selectively connects the input member 12 and the first node 18A of the first transfer gear 18 with the second node 14B of the first planetary gear set 14 and the first node 16A of the second planetary gear set 16. A fourth clutch 32 selectively connects the input member 12 and the first node 18A of the first transfer gear 18 with the first node 14A of the first planetary gear set 14. A first brake 34 selectively connects the third node 16C of the second planetary gear set 16 with a stationary member or transmission housing 50. A second brake 36 selectively connects the second node 14B of the first planetary gear set 14 and the first node 16A of the second planetary gear set 16 with a stationary member or transmission housing 50.

Figure 2:
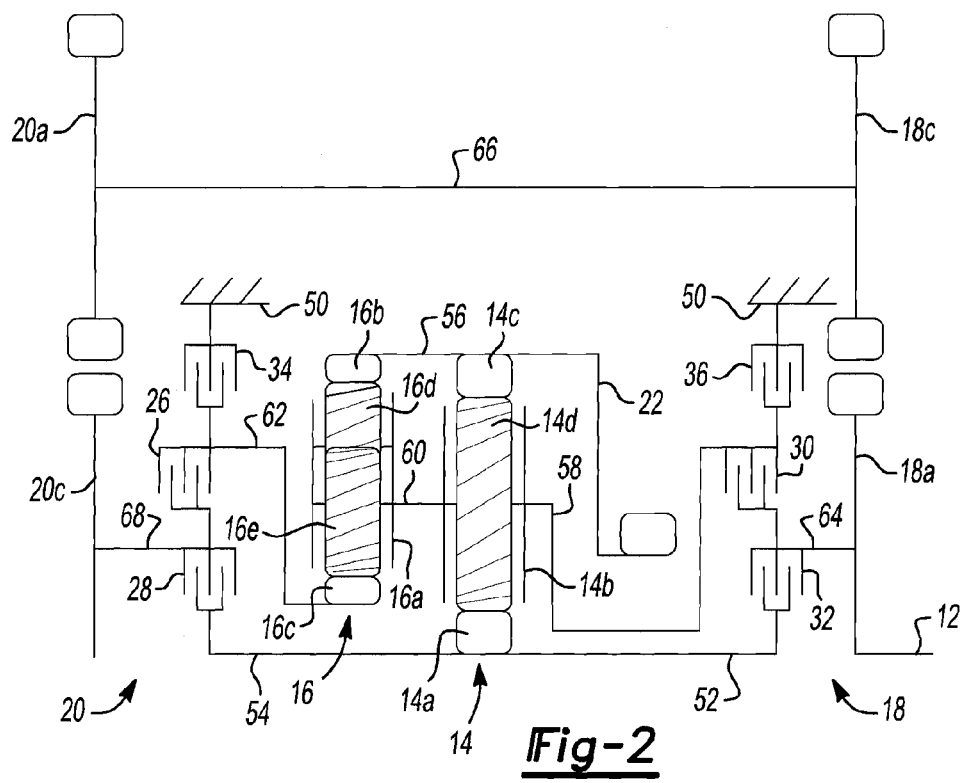
FIG. 2 is a diagrammatic illustration of an embodiment of an eight speed transmission.

Referring now to FIG. 2, a stick diagram presents a schematic layout of the embodiment of the eight speed transmission 10 according to the present invention. In FIG. 2, the numbering from the lever diagram of FIG. 1 is carried over. The clutches and members are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 52 and a second shaft or interconnecting member 54. The ring gear member 14C is connected for common rotation with the output shaft 22 and a third shaft or interconnecting member 56. The planet carrier member 14B is connected for common rotation with a fourth shaft or interconnecting member 58 and a fifth shaft or interconnecting member 60. The planet gears 14D are each configured to intermesh with both the sun gear member 14A and the ring gear member 14C.

The planetary gear set 16 includes a sun gear member 16C, a ring gear member 16B and a planet gear carrier member 16A that rotatably supports a first set of planet gears 16D (only one of which is shown) and a second set of planet gears 16E (only one of which is shown). The sun gear member 16C is connected for common rotation with a sixth shaft or interconnecting member 62. The ring gear member 16B is connected for common rotation with the third shaft or interconnecting member 56. The planet carrier member 16A is connected for common rotation with the fifth shaft or interconnecting member 60. The first set of planet gears 16D are each configured to intermesh with both the ring gear member 16B and second set of planet gears 16E. The second set of planet gears 16E are each configured to intermesh with both the sun gear member 16C and first set of planet gears 16D.

The first transfer gear or co-planar gear set 18 includes a first gear 18A intermeshed with a second gear 18C. The first gear 18A is connected for common rotation with the input member 12 and with a seventh shaft or interconnecting member 64. The second gear 18C is interconnected to an eighth shaft, interconnecting member or layshaft 66.

The second transfer gear or co-planar gear set 20 includes a first gear 20C intermeshed with a second gear 20A. The first gear 20C is connected for common rotation with a ninth shaft or interconnecting member 68. The second gear 20A is interconnected to the layshaft 66.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30, 32 and brakes 34 and 36 allow for selective interconnection of the shafts, rotary members, or interconnecting members, members of the planetary gear sets and transfer gears and the housing. For example, the first clutch 26 is selectively engageable to connect the ninth shaft or interconnecting member 68 with the sixth shaft or interconnecting member 62. The second clutch 28 is selectively engageable to connect the ninth shaft or interconnecting member 68 with the second shaft or interconnecting member 54. The third clutch 30 is selectively engageable to connect the seventh shaft or interconnecting member 64 with the fourth shaft or interconnecting member 58. The fourth clutch 32 is selectively engageable to connect the seventh shaft or interconnecting member 64 with the first shaft or interconnecting member 52. The first brake 34 is selectively engageable to connect the sixth shaft or interconnecting member 62 with the stationary element or the transmission housing 50 in order to restrict the member 62 from rotating relative to the transmission housing 50. The second brake 36 is selectively engageable to connect the fourth shaft or interconnecting member 58 with a stationary element or the transmission housing 50 in order to restrict the member 58 from rotating relative to the transmission housing 50.

Figures 3, 4:
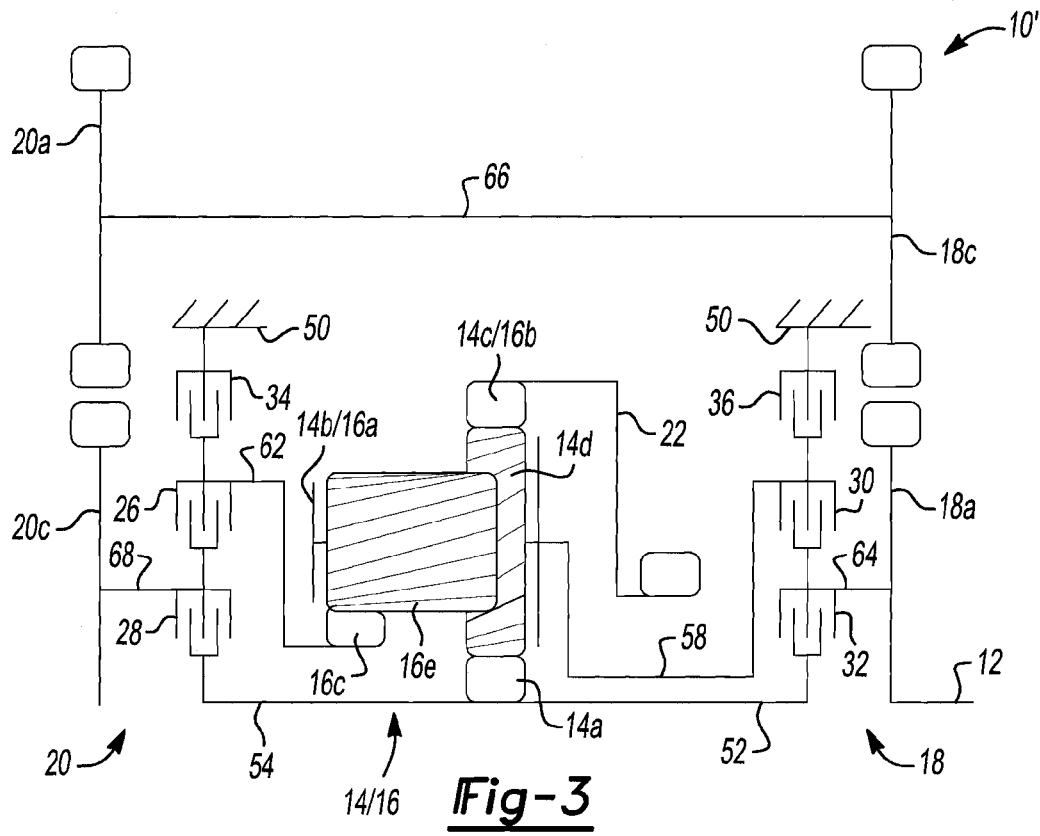
FIG. 3 is a diagrammatic illustration of another embodiment of an eight speed transmission.
FIG. 4 is a truth table presenting the state of engagement of the various torque transmitting mechanisms in each of the available forward and reverse speeds or gear ratios of the transmissions illustrated in FIGS. 1-3.

Referring now to FIG. 3, a schematic layout of another embodiment of the eight speed transmission according to the present invention is illustrated and referenced as 10'. In the present embodiment, the planetary gear sets 14 and 16 of transmission 10' share a common carrier member 14B/16B that rotatably supports a first set of planet gears 14D (only one of which is shown) and a second set of planet gears 16E (only one of which is shown). Accordingly, the third and fifth interconnecting shafts 56 and 60 have been eliminated. Further, the planetary gear set 14 includes a combined ring gear member 14C/16B and the sun gear member 14A and the planetary gear set 16 includes the sun gear member 16C.

Referring now to FIGS. 2, 3 and 4, the operation of the embodiments of the eight speed transmission 10 and 10' will be described. It will be appreciated that transmissions 10 and 10' are capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmissions 10 and 10'. An example of the gear ratios that may be obtained using the embodiments of the present invention are also shown in FIG. 4. Of course, other gear ratios are achievable depending on the gear diameter, gear teeth count and gear configuration selected.

To establish a reverse gear, the fourth clutch 32 and the second brake 36 are engaged or activated. For example, the fourth clutch 32 connects the seventh shaft or interconnecting member 64 with the first shaft or interconnecting member 52. The second brake 36 connects the fourth shaft or interconnecting member 58 with a stationary element or the transmission housing 50 in order to restrict the member 58 from rotating relative to the transmission housing 50. Likewise, the eight forward ratios are achieved through different combinations of clutch and brake engagement, as shown in FIG. 4.

It will be appreciated that the foregoing explanation of operation and gear states of the eight speed transmissions 10 and 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 5:
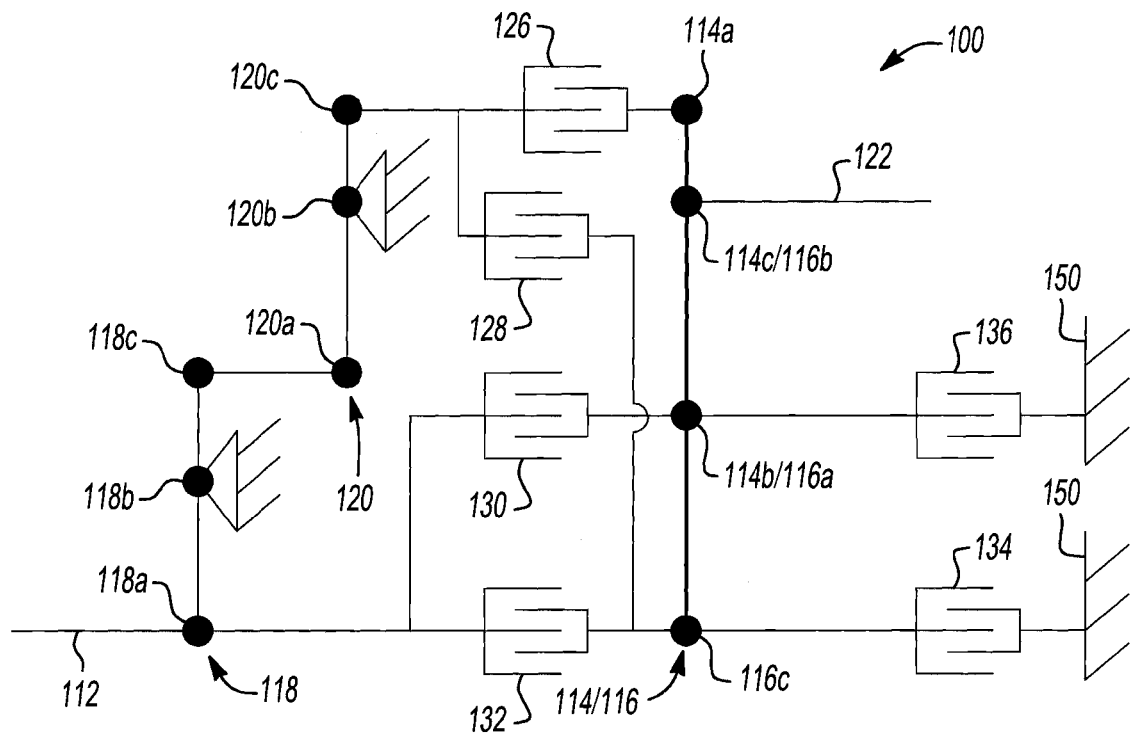
FIG. 5 is a lever diagram of another embodiment of an eight speed transmission.

Turning now to FIG. 5, another embodiment of an eight speed transmission 100 is illustrated in a lever diagram format. The transmission 100 is similar to the transmissions 10 and 10', however, the planetary gear sets 14 and 16 have been axially swapped. Accordingly, the transmission 100 includes an input shaft or member 112, a first planetary gear set 114, a second planetary gear set 116, a first transfer gear 118, a second transfer gear 120, and an output shaft or member 122. The first and second planetary gear sets 114 and 116 are represented by a single lever sharing common node points. The first planetary gear set has three nodes: a first node 114A, a second node 114B and a third node 114C. The second planetary gear set 116 has three nodes: a first node 116A, a second node 116B and a third node 116C. The first transfer gear includes three nodes: a first node 118A, a second node 118B and a third node 118C. The second transfer gear includes three nodes: a first node 120A, a second node 120B and a third node 120C.

The input member 112 is continuously coupled to the first node 118A of the first transfer gear 118. The output member 122 is coupled to the third node 114C of the first planetary gear set 114 and the second node 116B of the second planetary gear set 116. The third node 118C of the first transfer gear 118 is coupled to the first node 120A of the second transfer gear 120. The second nodes 118B and 120B of the first and second transfer gears 118 and 120 are fictional points used to represent the lever proportions and therefore the number of gear teeth between the first and third nodes 118A and 118C of the first transfer gear 118 and the first and third nodes 120A and 120C of the second transfer gear 120, respectively.

A first clutch 126 selectively connects the third node 120C of the second transfer gear 120 with the first node 114A of the first planetary gear set 114. A second clutch 128 selectively connects the third node 120C of the second transfer gear 120 with the third node 116C of the second planetary gear set 116. A third clutch 130 selectively connects the input member 112 and the first node 118A of the first transfer gear 118 with the second node 114B of the first planetary gear set 114 and the first node 116A of the second planetary gear set 116. A fourth clutch 132 selectively connects the input member 112 and the first node 118A of the first transfer gear 118 with the third node 116C of the second planetary gear set 116. A first brake 134 selectively connects the third node 116C of the second planetary gear set 116 with a stationary member or transmission housing 150. A second brake 136 selectively connects the second node 114B of the first planetary gear set 114 and the first node 116A of the second planetary gear set 116 with a stationary member or transmission housing 150.

Figure 6:
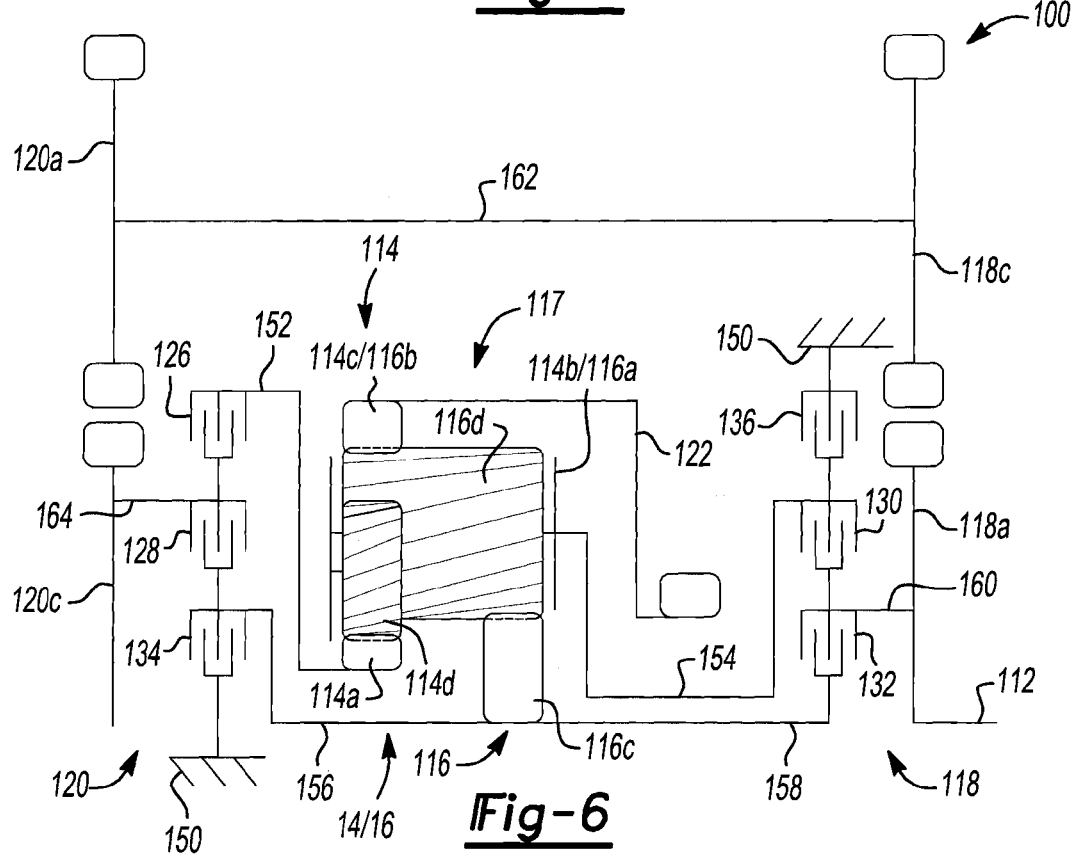
FIG. 6 is a diagrammatic illustration of an embodiment of an eight speed transmission.

Referring now to FIG. 6, a stick diagram presents a schematic layout of the embodiment of the eight speed transmission 100 according to the present invention. In FIG. 6, the numbering from the lever diagram of FIG. 5 is carried over. The clutches and members are correspondingly presented whereas the nodes of the planetary gear sets now appear as components of planetary gear sets such as sun gears, ring gears, planet gears and planet gear carriers.

For example, the planetary gear set 114 and the planetary gear set 116 are combined into a planetary gear assembly 117. In the planetary gear assembly 117, carrier members 114B and 116A are merged into a single carrier 114B/116A while ring gears 114C and 116B are merged into a single ring gear 114C/116B. Within the assembly 117, the first planetary gear set 114 includes a sun gear member 114A, the ring gear member 114C/116B, and the planet gear carrier member 114B/116A that rotatably supports a set of planet gears 114D (only one of which is shown) and 116D (only one of which is shown). The second planetary gear set 116 includes a sun gear member 116C and the planet gear carrier member 114B/116A. The planet gears 114D are each configured to intermesh with both the sun gear member 114A and the set of planet gears 116D. The set of planet gears 116D are each configured to intermesh with each of the planet gears 114D, the sun gear member 116C and the ring gear member 14C/116B.

The sun gear member 114A is connected for common rotation with a first shaft or interconnecting member 152. The ring gear member 114C/116B is connected for common rotation with the output shaft 122. The planet carrier member 114B/116A is connected for common rotation with a second shaft or interconnecting member 154. The sun gear member 116C is connected for common rotation with a third shaft or interconnecting member 156 and a fourth shaft or interconnecting member 158.

The first transfer gear or co-planar gear set 118 includes a first gear 118A intermeshed with a second gear 118C. The first gear 118A is connected for common rotation with the input member 112 and with a fifth shaft or interconnecting member 160. The second gear 118C is interconnected to a sixth shaft, interconnecting member or layshaft 162.

The second transfer gear or co-planar gear set 120 includes a first gear 120C intermeshed with a second gear 120A. The first gear 120C is connected for common rotation with a seventh shaft or interconnecting member 164. The second gear 120A is interconnected to the layshaft 162.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126, 128, 130, 132 and brakes 134 and 136 allow for selective interconnection of the shafts, rotary members, or interconnecting members, members of the planetary gear sets and transfer gears and the housing. For example, the first clutch 126 is selectively engageable to connect the seventh shaft or interconnecting member 164 with the first shaft or interconnecting member 152. The second clutch 128 is selectively engageable to connect the seventh shaft or interconnecting member 164 with the third shaft or interconnecting member 156. The third clutch 130 is selectively engageable to connect the fifth shaft or interconnecting member 160 with the second shaft or interconnecting member 154. The fourth clutch 132 is selectively engageable to connect the fifth shaft or interconnecting member 160 with the fourth shaft or interconnecting member 158. The first brake 134 is selectively engageable to connect the third shaft or interconnecting member 156 with the stationary element or the transmission housing 150 in order to restrict the member 156 from rotating relative to the transmission housing 150. The second brake 136 is selectively engageable to connect the second shaft or interconnecting member 154 with a stationary element or the transmission housing 150 in order to restrict the member 154 from rotating relative to the transmission housing 150.

Referring now to FIGS. 6 and 7, the operation of the embodiment of the eight speed transmission 100 will be described. It will be appreciated that transmission 100 is capable of transmitting torque from the input shaft or member 112 to the output shaft or member 122 in at least eight forward speed or torque ratios and at least one reverse speed or torque ratio. Each forward and reverse speed or torque ratio is attained by engagement of one or more of the torque-transmitting mechanisms (i.e. first clutch 126, second clutch 128, third clutch 130, fourth clutch 132, first brake 134 and second brake 136), as will be explained below. FIG. 7 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 7. Of course, other gear ratios are achievable depending on the gear diameter, gear teeth count and gear configuration selected.

To establish a reverse gear, the second clutch 128 and the second brake 136 are engaged or activated. For example, the second clutch 128 connects the seventh shaft or interconnecting member 164 with the third shaft or interconnecting member 156. The second brake 136 connects the second shaft or interconnecting member 154 with a stationary element or the transmission housing 150 in order to restrict the member 154 from rotating relative to the transmission housing 150. Likewise, the eight forward ratios are achieved through different combinations of clutch and brake engagement, as shown in FIG. 7.

It will be appreciated that the foregoing explanation of operation and gear states of the eight speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

By attaching the input member 12, 112 to the layshaft 66, 162 it is possible to attach other accessories to the layshafts 66, 162 such as auxiliary drives or pumps. Additionally, the transmissions 10, 10', and 100 minimize the center distances between the axes while providing low speeds and low clutch torques. In addition, an overdrive gearset could be added to provide additional drive options to the layshaft 66, 162 e.g., a secondary prime mover such as an electric engine may be connected to and selectively drive the layshaft 66, 162. The transmission of the present invention has many advantages and benefits over the prior art, for example, the present invention contemplates that transmissions disclosed above may be configured for both front wheel and rear wheel drive vehicles.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
an input member;
an output member;
first and second planetary gear sets each having first, second and third members,
first and second transfer gears each having a first member intermeshed with a second member, wherein the input member is continuously interconnected to at least one of the first and second transfer gears and the output member is continuously interconnected to at least one of the first and second planetary gear sets;
a layshaft continuously interconnecting the second gear of the first transfer gear with the first gear of the second transfer gear;
a first interconnecting member continuously interconnecting the second member of the first planetary gear set with the first member of the second planetary gear set;
a second interconnecting member continuously interconnecting the third member of the first planetary gear set with the second member of the second planetary gear set; and
six torque transmitting mechanisms each selectively engageable to interconnect at least one of the first, second and third members of the first and second planetary gear sets with at least one of the first and second members of the first and second transfer gears and a stationary member, and
wherein the torque transmitting mechanisms are selectively engageable in combinations of at least two to establish at least eight forward speed ratios and at least one reverse speed ratio between the input member and the output member.

2. The transmission of claim 1 wherein a first of the six torque transmitting mechanisms is selectively engageable to interconnect the second member of the second transfer gear with the third member of the second planetary gear set.

3. The transmission of claim 2 wherein a second of the six torque transmitting mechanisms is selectively engageable to interconnect the second member of the second transfer gear with the first member of the first planetary gear set.

4. The transmission of claim 3 wherein a third of the six torque transmitting mechanisms is selectively engageable to interconnect the first member of the first transfer gear and the input member with the second member of the first planetary gear set and the first member of the second planetary gear set.

5. The transmission of claim 4 wherein a fourth of the six torque transmitting mechanisms is selectively engageable to interconnect the first member of the first transfer gear and the input member with the first member of the first planetary gear set.

6. The transmission of claim 5 wherein a fifth of the six torque transmitting mechanisms is selectively engageable to interconnect the third member of the second planetary gear set with the stationary member.

7. The transmission of claim 6 wherein a sixth of the six torque transmitting mechanisms is selectively engageable to interconnect the second member of the first planetary gear set and the first member of the second planetary gear set with the stationary member.

8. The transmission of claim 1 wherein the first member of the first planetary gear set and the third member of the second planetary gear set are sun gears, the second member of the first planetary gear set and the first member of the second planetary gear set are carrier members, and the third member of the first planetary gear set and the second member of the second planetary gear set are ring gears.

9. The transmission of claim 1 wherein the first and second planetary gear sets are combined into a planetary gear assembly wherein the second member of the second planetary gear set and the first interconnecting member are integrated into the third member of the first planetary gear set and the first member of the second planetary gear set and the second interconnecting member are integrated into the second member of the first planetary gear set.

10. The transmission of claim 9 wherein the first member of the first planetary gear set and the third member of the second planetary gear set are sun gears, the second member of the first planetary gear set is a carrier member, and the third member of the first planetary gear set is a ring gear.

11. The transmission of claim 1 wherein the input member is continuously interconnected to the first member of the first transfer gear.

12. The transmission of claim 1 wherein the output member is continuously interconnected to the third member of the first planetary gear set.

13. A transmission comprising:
an input member;
an output member;
a planetary gear assembly having first, second, third, and fourth members;
a first co-planar gear set having a first member intermeshed with a second member;
a second co-planar gear set having a first member intermeshed with a second member;
an interconnecting member continuously interconnecting the second member of the first co-planar gear with the first member of the second co-planar gear;
a first torque transmitting mechanism selectively engageable to interconnect the second member of the second co-planar gear set with the second member of the planetary gear assembly;
a second torque transmitting mechanism selectively engageable to interconnect the second member of the second co-planar gear set with the first member of the planetary gear assembly;
a third torque transmitting mechanism selectively engageable to interconnect the first member of the first co-planar gear set and the input member with the third member of the planetary gear assembly;
a fourth torque transmitting mechanism selectively engageable to interconnect the first member of the first co-planar gear set and the input member with the first member of the planetary gear assembly;
a fifth torque transmitting mechanism selectively engageable to interconnect the second member of the planetary gear assembly with a stationary member; and a sixth torque transmitting mechanism selectively engageable to interconnect the third member of the planetary gear assembly with the stationary member, and wherein the torque transmitting mechanisms are selectively engageable in combinations of at least two to establish at least eight forward speed ratios and at least one reverse speed ratio between the input member and the output member.

14. The transmission of claim 13 wherein the first member of the planetary gear assembly is a sun gear, the second member of the planetary gear assembly is a sun gear, the third member of the planetary gear assembly is a carrier member, and the fourth member of the planetary gear assembly is a ring gear.

15. The transmission of claim 14 wherein the input member is continuously interconnected to the first member of the first co-planar gear set.

16. The transmission of claim 15 wherein the output member is continuously interconnected to the fourth member of the planetary gear assembly.

17. A transmission comprising:
an input member;
an output member;
a planetary gear assembly having first, second, third, and fourth members;
a first co-planar gear set having a first member intermeshed with a second member;
a second co-planar gear set having a first member intermeshed with a second member;
an interconnecting member continuously interconnecting the second member of the first co-planar gear with the first member of the second co-planar gear;
a first torque transmitting mechanism selectively engageable to interconnect the second member of the second co-planar gear set with the second member of the planetary gear assembly;
a second torque transmitting mechanism selectively engageable to interconnect the second member of the second co-planar gear set with the first member of the planetary gear assembly;
a third torque transmitting mechanism selectively engageable to interconnect the first member of the first co-planar gear set and the input member with the third member of the planetary gear assembly;
a fourth torque transmitting mechanism selectively engageable to interconnect the first member of the first co-planar gear set and the input member with the first member of the planetary gear assembly;
a fifth torque transmitting mechanism selectively engageable to interconnect the second member of the planetary gear assembly with a stationary member; and
a sixth torque transmitting mechanism selectively engageable to interconnect the third member of the planetary gear assembly with the stationary member, and wherein the torque transmitting mechanisms are selectively engageable in combinations of at least two to establish at least eight forward speed ratios and at least one reverse speed ratio between the input member and the output member.

18. The transmission of claim 17 wherein the first member of the planetary gear assembly is a sun gear, the second member of the planetary gear assembly is a sun gear, the third member of the planetary gear assembly is a carrier member, and the fourth member of the planetary gear assembly is a ring gear.

19. The transmission of claim 17 wherein the input member is continuously interconnected to the first member of the first co-planar gear set and the output member is continuously interconnected to the fourth member of the planetary gear assembly.

* * * * *